United States Patent Office 3,764,365
Patented Oct. 9, 1973

3,764,365
ADHESION IMPROVING AGENT FOR URETHANE COATINGS ON RUBBER
Joe S. Duncan, Mogadore, and Otto C. Elmer, Akron, Ohio, assignors to The General Tire & Rubber Company
No Drawing. Continuation-in-part of application Ser. No. 127,032, Mar. 22, 1971. This application Jan. 21, 1972, Ser. No. 219,827
Int. Cl. B32b 5/02, 5/04
U.S. Cl. 117—33                                    4 Claims

ABSTRACT OF THE DISCLOSURE

This invention concerns an adhesive and coating composition for rubber substrates comprising an isocyanate-reactive polyester, a block isocyanate, a catalyst for heat releasing the blocked isocyanate, and from 0.5 to 10.0 weight percent, based upon the combined weight of the polyester and the isocyanate, of a material selected from the group consising of finely divided particulate aerogel silicas and silicates, finely divided particulate anhydrous silicas and silicates, and mixtures thereof wherein the specific surface area of the material is greater than about 50 m.$^2$/gm.

---

This application is a continuation-in-part of copending U.S. patent application Ser. No. 127,032, filed, Mar. 22, 1971, for "Adhesion Improving Agent for Urethane Coatings on Rubber," and now abandoned.

BACKGROUND OF THE INVENTION

Field of the invention

This invention relates to the field of adhesives and coatings. More particularly, this invention relates to the field of urethane adhesives and coatings for rubbery substrates.

DESCRIPTION OF THE PRIOR ART

In the field of urethane adhesives and coatings, it is known to use polyisocyanate compounds and isocyanate-reactive polyesters in combination wherein the NCO groups of the polyisocyanate are temporarily restrained from reaction (U.S. Pat. No. 2,801,990). Generally, the highly reactive NCO groups of the isocyanate will quickly react with the polyester and other compounds containing labile hydrogen atoms (compounds which give a positive Zerewitinov Test*) over a wide temperature range to form a polyurethane; by temporarily blocking or masking these reactive NCO groups, isocyanates may be admixed with labile hydrogen containing polyesters and the resultant mixture handled conveniently as an adhesive or coating composition. This practice is employed where the exigencies of the process or other reaction moieties are such that it is not desirable to have the polyurethane forming reaction occur immediately upon mixing.

For instance, in the field of coatings and adhesives it is more desirable to pass the substrate to be coated through a bath of coating reactants and then either cure the coating at a later stage or assemble the coated substrate in combination with other adherends and then cure (react) the adhesive. Another example would be where a urethane adhesive is used in a flocking operation; obviously, it is more desirable to have the adhesive remain unreactive during flocking and then later react or cure to fully bond the flock to the substrate.

Generally speaking, blocked isocyanates contain blocking agents that are weakly bonded to the NCO groups and are amenable to being dissociated therefrom; the iso-

*The Zerewitinov Test involves addition of the compound in question to a Grignard solution of methyl-iodide, a positive test occurs when the compound decomposes the Grignard reagent to liberate methane gas.

cyanate may be regenerated by merely applying sufficient heat to cause this dissociation. Examples of these dissociable blocking agents include tertiary alcohols, secondary aromatic amines, mercaptans, lactams, imides, monohydric phenols, and others; phenol and lower alkyl substituted (ortho, para, and meta) phenols, such as paracresol are by far the most popular blocking agents.

The isocyanate adhesive or coating composition is usually prepared by first blocking the isocyanate with a blocking agent in an inert liquid medium at relatively low temperatures (25° to 150° C.) and optionally in the presence of a small amount of a catalyst such as a tertiary amine. These blocked isocyanates are thereafter mixed with isocyanate-reactive polyesters, catalysts for unblocking the blocked isocyanate, and optionally other ingredients such as tackifiers, colorants, solvents, etc. and then applied to the substrate. After laminating an adherend thereto such as a textile or other material or whether left as a coating, the composition-coated substrate is subjected to heat to the extent that the blocked isocyanate is unblocked and reacts with the polyester to form the polyurethane film.

Fillers comprising finely divided particulate material, especially reinforcing fillers, are known to be used in adhesives and coating compositions. Silicas and silicates especially have been used in these compositions in varying amounts ranging from 20 parts and more to achieve higher film strength and improve other properties such as abrasion resistance, weatherability, etc.

This invention is based upon the discovery that small, definite amounts, i.e., smaller than suggested or taught in the prior art, of specific types of silicas significantly improve the adhesion of the urethane composition to the rubbery substrate. Thus, where a urethane composition is used as an adhesive between a rubbery substrate and an overlying adherend, the adhesion therebetween is markedly improved. Similarly, where the composition is used as a coating for a rubbery substrate, the adhesion of the coating to the substrate is significantly improved.

Therefore, the main object of this invention is an improved adhesive and coating composition for various rubbery substrates. Other objects include an improved adhesive for rubbery substrates for use in flocked articles, improved coatings for rubbery substrates, articles having improved adhesion between rubbery portions therein and overlying materials bonded thereto, and methods of improving existing urethane coating and adhesive compositions for use on rubbery substrates. These and other objects will become more apparent upon reading the following description of the preferred embodiments and the claims appended thereto.

SUMMARY OF THE INVENTION

This invention concerns an adhesive composition for bonding adherends to rubbery surfaces comprising an isocyanate- reactive polyester, a blocked isocyanate, a catalyst for unblocking the blocked isocyanate, and from 0.5 to 10.0 weight percent (based upon the combined weight of the polyester and the isocyanate) of a material selected from the group consisting of finely divided particulate aerogel silicas and silicates, finely divided particulate anhydrous silicas and silicates, and mixtures thereof wherein the specific surface area of the material is greater than about 50 m.$^2$/gm.

DESCRIPTION OF THE PREFERRED EMBODIMENT

This invention pertains particularly to urethane coatings and adhesives. The term "adhesive" is used herein to indicate any substance that sticks or binds material together whereas the term "coating" is used to mean something covering or spread over a surface. The term "composition" is used herein to denote that the adhesive or coating material is in its precured stage, i.e., in a liquid form that is readily applicable to a rubbery substrate; this is in distinction to the adhesive or coating per se which these terms indicate that the material is in its cured stage.

The adhesive composition of this invention is useful in bonding rubbery substrates to a variety of materials hereinafter referred to as "adherends." Particularly usable as an adherend are textiles such as cloth, either woven or nonwoven, and flocks such as nylon, Dacron or cotton flocks that may be used on rubbery surfaces to make a variety of articles, such as door gaskets for automobiles and other vehicles, articles of clothing, furniture covering and the like.

The urethane adhesives and coating compositions of this invention are applicable for use on a wide variety of rubbery substrates including many rubbers such as natural rubber, acrylic rubber, butadiene-styrene rubber, chloroprene rubber, chloro-sulfonated polyethylene, isobutylene isoprene rubber, isoprene rubber and butadiene rubber, nitrile butadiene rubber, ethylene propylene rubber (EPR), ethylene-propylene-diene rubber (EPDM), polyisobutylene rubber, polysulfide rubber, silicone rubber, and urethane rubber. In addition, the rubbery substrates may comprise the aforementioned rubbers and contain minor amounts, i.e., less than 50% by weight, of other polymeric substances such as polyamides, polyolefins, halogenated vinyls and halogenated polyolefins. The surfaces of these rubbery materials are the substrates to which the adhesives and coating compositions of this invention are applied. The substrate may be preliminarily swabbed with a solvent to remove traces of mold release or other compounds.

The adhesive and coating compositions of this invention are first made by obtaining an isocyanate-reactive polyester. These polyesters are generally polycondensation products of glycols with saturated polycarboxylic acids and their derivatives. Examples of glycols for use in forming these isocyanate-reactive polyesters include ethylene glycol; propylene glycol; butane 2,3-diol; trimethylene glycol; butane 1,3-diol; 2-methyl-propane 1,3-diol; 2,2-dimethyl propane-1,3-diol; 2,2-diethyl propane-1,3-diol; cis-2-butene-1,4-diol; trans-2-butene-1,4-diol; tetramethyleneglycol; pentamethylene glycol; etc. Examples of polycarboxylic acids and their derivatives usable herein include dicarboxylic acids such as succinic acid, glutaric acid, adipic acid, suberic acid, azelaic acid, sebacic acid, maleic acid, dicarboxylic acid anhydride such as phthalic anhydride, itaconic anhydride, maleic anhydride, tetrachlorophthalic anhydride, chlorophthalic anhydride and other polybasic acids, such as as tricarballylic acid, citric acid, etc. Preferred among these isocyanate-reactive polyesters is an ethylene-butylene adipate polyester of about 2000 molecular weight.

Added to the isocyanate-reactive polyester is a blocked isocyanate of the type heretofore described. A wide variety of blocked isocyanates are usable herein, for example Hylene® MP, a phenol blocked methylene bis (4-phenyl isocyanate) commercially available from E. I. du Pont de Nemours & Company; Isonate® 123P, a caprolactam blocked methylene bis (4-phenyl isocyanate) commercially available from Upjohn Company; Mondur® S, a phenol blocked adduct of 2,4-toluene diisocyanate and trimethylol propane, commercially available from Mobay Chemical Company, and Mondur® SH, a cresol blocked adduct of 2,4-toluene diisocyanate and trimethylolpropane, commercially available from Mobay Chemical Company. These blocked isocyanates are generally in solid form and may be admixed with the isocyanate-reactive polyesters which are themselves usually in the form of heavy syrups or in solutions with various solvents.

To this mixture is generally added a catalyst for lowering the unblocking temperature of the blocked isocyanate. Various catalysts are known for this purpose such as certain amine compounds (United States Patents 2,916,403 and 3,267,078) and certain organo tin compounds (United States Patent 3,205,201 and Australian complete specification 50,757/64), and quaternary ammonium compounds. These catalysts are merely stirred into the mixture or solution of the isocyanate-reactive polyester and blocked isocyanate.

To this mixture is next added the material which significantly improves the adhesion of the crude composition to the rubbery substrate. This material comprises from 0.5 to 10.0 weight percent (based upon the combined weight of the polyester and the isocyanate) of finely divided particulate aerogel silicas and silicates, finely divided particulate anhydrous silicas and silicates, and mixtures thereof wherein the specific surface area of these materials is greater than about 50 m.$^2$/gm. These materials are merely stirred into the composition.

There are three general types of silicas and silicates that are used as reinforcing silicas and silicates. Hydrated silicas and silicates are made by a process that involves the acidification of soluble (alkali) silicates to produce hydrated silica. Aerogel silicas and silicates are made by a process that involves replacing the water in a silica gel with an organic liquid such as an alcohol to form an organo gel, heating the organo gel in an autoclave above the critical temperature of the organic liquid so that no meniscus exists between the liquid and gas phases, then venting the autoclave to remove the liquid phase without collapsing the gel. Anhydrous silicas and silicates are made by a process that involves reacting silicon tetrachloride, hydrogen, and oxygen at 1,850–2,000° F. to produce anhydrous silica plus hydrogen chloride. Of these three types of silicas, only the latter two are usable in this invention, i.e., only the aerogel and anhydrous silicas are usable herein. In addition, only silicas and silicates having a specific surface area of greater than 50 square meters per gram (m.$^2$/gm.) are usable herein. In virtually all cases, aerogel and anhydrous silicas have specific areas exceeding this value, whereas most hydrated silicas do not.

The surprising aspect of this invention is that when these particular type silicas and silicates are added to the aforedescribed composition in amounts ranging from 0.5 to 10.0 weight percent based upon the combined weight of the polyester and the isocyanate, the degree of adhesion to the underlying rubbery substrate is significantly improved, in some cases more than quadrupled. Upon exceeding 10.0 weight percent of these materials, the degree of adhesion is drastically reduced to much less than the values obtained when using these materials within this particular range. Also, with respect to this particular range, it has been found that the specific amount of 2.80 weight percent of these silicas produces the peak or the highest amount of increased adhesion of the urethane coating or adhesive to the rubbery substrate.

The urethane composition may also contain other materials such as solvents, solvent mixtures, colorants, and additional adhesion improvers. With respect to solvents, it has been found with the preferred ethylene-butylene-adipate polyester and the phenol blocked adduct of 2,4-toluene diisocyanate and trimethylol-propane (blocked isocyanate) that a solvent mixture consisting of methylethyl ketone and xylene in a preferred weight ratio of 74/26:MEK/xylene provides enchanced handling of the composition and improved adhesion of the composition to the substrate. With respect to additional adhesion improvers, it is preferred to include in the above composition a small, i.e., 0.5 to 0.8 weight percent (based on the combined weight of the polyester and the isocyanate) of a chlorinated rubber such as Parlon® S–125, a chlorinated natural rubber available from Hercules Chemical Company.

This adhesive and coating composition may be applied to a rubbery substrate using any known application technique that provides a uniform layer of composition, such as drawbar coating, brushing, spraying, dipping, calendering, etc.

The above-described composition not only is usable as an adhesive between a rubbery substrate and an adherend but is also usable as a highly wear resistant and durable coating for rubbery surfaces such as for rubber-coated cables, rubber-coated electrical wiring, etc.

In both instances, i.e., as an adhesive or as a coating, the composition must be cured to become usable. To cure the composition, it must be heated to a temperature at which the blocked isocyanate becomes unblocked and reacts with the polyester to form a polyurethane. In addition, as the composition is being heated, volatiles such as solvents and blocking agents, etc., will be flashed off to leave behind a dry composition. The temperature to which the composition must be heated to release or unblock the isocyanate depends upon the type of blocked isocyanate and the efficacy of the catalyst for lowering the unblocking temperature. As to the blocked isocyanate per se, the aforementioned Hylene® MP [phenol blocked methylene bis-(4-phenyl isocyanate)] becomes unblocked at a temperature of about 300° F., Isonate® 123P [caprolactam blocked methylene bis(4-phenyl isocyanate)] unblocks at a temperature of 280° F., Mondur® S (phenol blocked 2,4 toluene diisocyanate and trimethylol-propane adduct) unblocks at a temperature of about 338° F., and Mondur® SH (cresol blocked 2,4-toluene diisocyanate and tri-methyl-propane adduct) unblocks at a temperature of about 288° F. With respect to the catalyst for lowering the unblocking temperature, the extent of lowering depends upon the type and amount of catalyst used; generally speaking, the reduction in heat release temperature is between 5° and 100° F.

Used thusly, the adhesive composition and/or coating composition of this invention will provide either a tenacious bond between the rubbery surface and an overlying adherend or provide a highly adherent, wear resistant and durable coating over the rubbery surface. Such compositions find a wide variety of uses in articles that comprise at least one vulcanized rubbery surface over which the composition may be used. Examples of these articles include rubber automobile bumpers, rubber tires, rubber gaskets, rubber diaphragms, rubber-covered cables, rubber tarpaulins, etc. In all of these articles, the exposed vulcanized rubbery surface may benefit from the utilization of the hereinbefore described compositions.

Following are examples given to show one skilled in the art how to practice this invention as well as to show some of the limitations inherent therein. In these examples, all parts are parts by weight and all percentages are percentages by weight unless otherwise denoted.

EXAMPLE

A typical blocked isocyanate-containing urethane adhesive cement was made according to the following recipe:

Ingredients: Parts
Ethylene butylene adipate polyester (2000 MW) _____ 720.00
Mondur® S blocked isocyanate _____ 492.70
Dibutyl tin dilaurate (heat unblocking catalyst) _____ 6.40
Quaternary ammonium saccharinate (heat unlocking catalyst) _____ 6.40
Parlon® S–125 (adhesion improver) _____ 8.00
Methyl ethyl ketone _____ 1014.10
Xylene _____ 612.00

The ingredients were admixed to form a smooth liquid.
The following rubbery compouds were prepared according to the formulations listed below:

Ingredients: Parts
Nordel 1470 (EPDM rubber) _____ 100.00
Zinc oxide _____ 5.00
Stearic acid _____ 1.00
FEF carbon black _____ 110.00
Cricosol 42XH (oil) _____ 30.00
Sulfur _____ 2.00
Methyl tuads _____ 0.50
Altax _____ 1.00
Butyl zimate _____ 2.00

Part of the stock was cured for 10 minutes at 350° F. Following properties were determined:

100% modulus, p.s.i.—1325 (ASTM D–412)
Tensile strength, p.s.i.—2425 (ASTM D–412)
Elongation, percent—180 (ASTM D–412)
Shore A hardness—80

Ingredients: Parts
SBR 1500 (SBR rubber) _____ 100.00
Zinc oxide _____ 5.00
Stearic acid _____ 2.00
HAF carbon black _____ 65.00
Agerite Stalite _____ 1.00
Sulfur _____ 2.00
Altax _____ 1.00
Cumate _____ 0.35

Part of the stock was cured for 10 minutes at 350° F. Following properties were determined:

100% modulus, p.s.i.—1400
Tensile strength, p.s.i.—3825
Elongation, percent—220
Shore A hardness—79

Ingredients: Parts
Neoprene GRT rubber _____ 100.00
Zinc oxide _____ 7.50
Stearic acid _____ 3.00
HAF carbon black _____ 40.00
Agerite D _____ 1.00
Altax _____ 0.50
Maglite K _____ 4.00

Part of the stock was cured for 10 minutes at 350° F. Following properties were determined:

100% modulus, p.s.i.—950
200% modulus, p.s.i.—2575
300% modulus, p.s.i.—3569
Tensile strength, p.s.i.—3850
Elongation percent—300
Shore A hardness—77

Ingredients: Parts
Hycar® 1042 (NBR rubber) _____ 100.00
Zinc oxide _____ 5.00
Stearic acid _____ 1.00
HAF carbon black _____ 40.00
Agerite White _____ 2.00
Sulfur _____ 1.75
Altax _____ 1.50
Methyl tuads _____ 0.10

Part of the stock was cured for 10 minutes at 350° F. Following properties were determined:

100% modulus, p.s.i.—584
200% modulus, p.s.i.—1593
Tensile strength, p.s.i.—2265
Elongation percent—260
Shore A hardness—74

The cements were then brush coated onto 4 inch x 7 inch x 0.08 inch samples of the uncured sheets of the rubbery stocks. The samples were flocked electrostatically with 1/32 inch Dacron and then cured 10 minutes at 350° F. Sandwich structures were made by applying an epoxy cement to 1 inch x 6 inch strips of the flocked samples and clamping them (cement side down) onto small plywood boards 1½ inches x 5¾ inches x ¼ inch and the cement cured at room temperature. Using ASTM test D-429B the bonded structure was clamped in an Instron testing machine so the rubber strip was pulled away from the urethane cement film at a 90° angle and adhesion values recorded in pounds per inch. The rate of peel was 2 inches per minute. The following adhesion values were found:

| Rubber | Type of silica | Specific surface, m.²/gm. | Amount silica added, # | Adhesion value, lb./in. |
|---|---|---|---|---|
| EPDM | Aerogel [2] | 280 | 0 | 10 |
| EPDM | do.[2] | 280 | 0.77 | 12 |
| EPDM | do.[2] | 280 | 2.83 | 21 |
| EPDM | do.[2] | 280 | 8.50 | 9 |
| EPDM | do.[2] | 280 | 0 | 15 |
| EPDM | do.[2] | 280 | 2.83 | 35 |
| EPDM | Aerogel [3] | 150 | 0 | 15 |
| EPDM | do.[3] | 150 | 2.83 | 43 |
| EPDM | Anhydrous [4] | 390 | 0 | 15 |
| EPDM | do.[4] | 390 | 2.83 | 44 |
| SBR | Aerogel [2] | 280 | 0 | 4 |
| SBR | do.[2] | 280 | 0.71 | 6 |
| SBR | do.[2] | 280 | 2.83 | 29 |
| SBR | do.[2] | 280 | 8.50 | 9 |
| SBR | do.[2] | 280 | 0 | 12 |
| SBR | do.[2] | 280 | 2.83 | 23 |
| SBR | Hydrated [5] | 140 | 0 | 12 |
| SBR | do.[5] | 140 | 1.42 | 7 |
| SBR | do.[5] | 140 | 2.83 | 11 |
| SBR | Hydrated [6] | 40 | 0 | 8 |
| SBR | do.[6] | 40 | 1.42 | (¹) |
| SBR | do. | 40 | 2.83 | (¹) |
| Neoprene | Aerogel [2] | 280 | 0 | 24 |
| Do. | do.[2] | 280 | 0.71 | 56 |
| NBR | do.[2] | 280 | 0 | 22 |
| NBR | do.[2] | 280 | 0.71 | 34 |

¹ Silica would not disperse in cement because the particle size was too big.
² Santocel® Z—Monsanto Chemical Company.
³ Santocel® 54—Monsanto Chemical Company.
⁴ Cab-O-Sil® EH-5—Cabot Corporation.
⁵ HiSil® 33—PPG Industries.
⁶ Silene® D—PPG Industries.

NOTE.—#=Parts by weight of silica per 100 parts by weight of urethane adhesive cement of column 5, lines 60-70, supra.

As seen with the EPDM and SBR substrates, the degree of adhesion improves significantly from "0" parts to "0.71" parts of silica and peaks out at about "2.80" parts silica. The hydrated silicas are shown to be inoperative in this invention, even when the specific surface of the particle (hence the particle size per se) is varied. Note should be made that the adhesion at "0" parts of silica varies somewhat; this sample-to-sample variation is widely recognized in the adhesives art. It is thought to be caused by the interaction of a variety of factors such as the variation in relative humidity, variation in room temperature, variation in amount of dust in the air, etc. There can be no doubt, however, from the results shown herein that the addition of from 0.5 to 10.0 weight percent aerogel or anhydrous silica of 50m.²/gm. specific surface area will make a significant improvement in the adhesion.

What is claimed is:

1. An article comprising at least one vulcanized rubbery surface having a highly adhesive and highly wear resistant polyesterurethane coating attached directly thereto, said coating being the cured form of the composition consisting essentially of:
   (a) an isocyanate reactive polyester;
   (b) a blocked isocyanate;
   (c) a catalyst for unblocking said blocked isocyanate; and
   (d) from 0.5 to 10.0 weight percent, based upon the combined weight of polyester and isocyanate, of a material of finely divided particulate aerogel silicas or finely divided particulate anhydrous silicas or mixtures thereof wherein the specific surface area of said material is greater than about 50 m²./gm.

2. The article of claim 1 wherein said material is present in the amount of 2.80 weight percent.

3. The article of claim 1 wherein said composition contains additionally a chlorinated rubber adhesion improver in an amount of from 0.5 to 0.8 weight percent, based on the combined weight of the polyester and the isocyanate.

4. The article of claim 1 containing additionally a layer of flock adhered to said coating opposite from said vulcanized rubbery surface.

References Cited

UNITED STATES PATENTS

| | | | |
|---|---|---|---|
| 3,098,755 | 7/1963 | Barth et al. | 117—138.8 X |
| 3,687,719 | 8/1972 | Klotzer et al. | 260—37 X |
| 3,356,635 | 12/1967 | Heer et al. | 260—37 |
| 3,115,479 | 12/1963 | Windemuth et al. | 117—139 X |
| 3,158,586 | 11/1964 | Krause | 260—37 |
| 3,248,371 | 4/1966 | Damusis | 260—77.5 |
| 3,326,844 | 6/1967 | Gruber | 260—37 |
| 3,607,822 | 9/1971 | Nishino | 260—37 |

OTHER REFERENCES

Damusis, A.: "Sealants," pub. October 1967, Reinhold N.Y., pp. 142–146 and 156.

Kraus, G.: "Reinforcement of Elastomers," 1965, Wiley & Sons, N.Y. pp. 405–421.

MURRAY KATZ, Primary Examiner

S. L. CHILDS, Assistant Examiner

U.S. Cl. X.R.

117—138.8 UA, 139, 161 KP; 260—37 N

UNITED STATES PATENT OFFICE
CERTIFICATE OF CORRECTION

Patent No. 3,764,365      Dated October 9, 1973

Inventor(s) Joe S. Duncan and Otto C. Elmer

It is certified that error appears in the above-identified patent and that said Letters Patent are hereby corrected as shown below:

Column 1, line 15, which reads: "a block isocyanate" should read ---a blocked isocyanate---.

Column 3, line 51, which reads: "such as as tricarballylic" should read ---such as tricarballylic---.

Column 4, line 8, which reads: "crude" should read ---cured---.

Column 5, line 64, which reads: "6.40" should read ---9.60---.

Column 5, line 66, which reads: "unlocking catalyst" should read ---unblocking catalyst---.

Column 7, line 28, which reads: "do" should read ---do.$_6$---.

Column 7, line 34, which reads: "HiSil® _33" should read ---HiSil® 233---.

Signed and sealed this 10th day of September 1974.

(SEAL)
Attest:

McCOY M. GIBSON, JR.
Attesting Officer

C. MARSHALL DANN
Commissioner of Patents